United States Patent
Chen et al.

(10) Patent No.: US 7,327,787 B1
(45) Date of Patent: Feb. 5, 2008

(54) METHOD AND APPARATUS FOR MOTION ESTIMATION

(75) Inventors: Yen-Kuang Chen, Franklin Park, NJ (US); Hong Jiang, El Dorado Hills, CA (US)

(73) Assignee: Intel Corporation, Santa Clara, CA (US)

( * ) Notice: Subject to any disclaimer, the term of this patent is extended or adjusted under 35 U.S.C. 154(b) by 1344 days.

(21) Appl. No.: 09/717,500

(22) Filed: Nov. 20, 2000

(51) Int. Cl.
- *H04N 7/12* (2006.01)
- *H04N 11/02* (2006.01)
- *G06K 9/46* (2006.01)

(52) U.S. Cl. .................. 375/240.16; 382/236
(58) Field of Classification Search ........... 375/240.16, 375/240.14, 240.02; 348/699; 382/236
See application file for complete search history.

(56) References Cited

U.S. PATENT DOCUMENTS

| | | | | |
|---|---|---|---|---|
| 5,557,341 A | * | 9/1996 | Weiss et al. ............... | 348/699 |
| 5,581,308 A | * | 12/1996 | Lee ........................ | 348/699 |
| 5,635,994 A | * | 6/1997 | Drexler et al. ............ | 348/699 |
| 5,731,850 A | * | 3/1998 | Maturi et al. ............. | 348/699 |
| 5,739,872 A | * | 4/1998 | Kim et al. ................ | 348/699 |
| 5,801,778 A | * | 9/1998 | Ju ......................... | 375/240.15 |
| 6,130,912 A | * | 10/2000 | Chang et al. ............. | 375/240.16 |
| 6,167,090 A | * | 12/2000 | Iizuka .................... | 375/240.16 |
| 6,222,883 B1 | * | 4/2001 | Murdock et al. ......... | 375/240.16 |
| 6,317,136 B1 | * | 11/2001 | Choi ...................... | 345/537 |
| 6,380,986 B1 | * | 4/2002 | Minami et al. ........... | 348/699 |
| 6,567,469 B1 | * | 5/2003 | Rackett .................. | 375/240.16 |

OTHER PUBLICATIONS

'An efficient hybrid search algorithm for fast block matching in video coding', Jae-Yong Kim et al., Tencon 99, Proceedings of the IEEE Region 10 Conference vol. 1, Sep. 15-17, 1999 pp. 112-115 vol. 1.*

* cited by examiner

*Primary Examiner*—Mehrdad Dastouri
*Assistant Examiner*—Erick Rekstad
(74) *Attorney, Agent, or Firm*—Blakely, Sokoloff, Taylor & Zafman LLP (57) ABSTRACT

A method and system of motion estimation for video data compression is disclosed. Individual frames of video data are divided into blocks of pixels. One frame is searched to find a block of pixels that matches intensity with the block of pixels from a second frame. In one embodiment, a motion estimator performs a rhombus shaped search of progressively smaller range for a matching block of pixels. In one embodiment, prediction motion vector is used to reduce the search efforts. In one embodiment, the actual shape of the rhombus can be adjusted to the type of motion expected.

29 Claims, 13 Drawing Sheets

METHOD AND APPARATUS FOR MOTION ESTIMATION

BACKGROUND

When video data is compressed, redundant data that can be easily restored is removed to take up less storage space or transmission bandwidth. Much of video data comprises a series of frames in which much of the image is the same or similar as objects move in the field. By tracking this moving object, the amount of data recorded can be reduced into what in the image is changed by the object moving and the rest of the data can be substituted with data recorded for a previous frame.

What is needed is an improved method of estimating how a block of pixels will move within a frame of video data.

BRIEF DESCRIPTION OF THE DRAWINGS

FIG. 1(a-d) is a diagram illustrating multilevel rhombus-shaped searching.

FIG. 3 (a-b) is a diagram illustrating adaptive shape rhombus-shaped searching.

FIG. 5(a-b) is a diagram illustrating calculating prediction motion vectors.

DETAILED DESCRIPTION

Motion estimation is a key component in video encoding. Video encoding is used from low-bit-rate Internet-based communications to high-bit-rate video broadcasting. The invention described relates to technology for fast motion estimation. In one embodiment, this invention can be used in a video encoder system, in which video data is compressed according to video compression standard such as MPEG (Motion Picture Expert Group). The technology can be implemented as computer software in a computer system. The technology can also be implemented in the chipset products such as a hardware video-encoding accelerator.

The motion estimation method described performs multi-level rhombus searches for matching blocks of pixels within two frames of the video data being compressed. In one embodiment the blocks are of a 16 by 16 size, but the size and the shape of the pixel block can be varied according to implementation. A block is determined to match if the block meets specific criteria. In one embodiment, the blocks are compared to determine the sum of the absolute difference in intensity between the pixels in the blocks. Alternatively, the blocks are compared to determine the pixel color difference between the pixels in the blocks. Determining relative movement of a block from frame to frame facilitates reducing the amount of data stored about the frame.

In one embodiment, the multilevel rhombus search finds where a block of pixels has moved to in one frame in relation to another frame. A rhombus is a quadrilateral shape in which the opposing sides are parallel and all sides are of equal length, but the angles have no such requirements. These requirements contrast with the similar diamond shape, which requires a right angle at the corners.

In one embodiment, the user sets the initial range of the search, or how much of the frame is searched for the block of pixels. The search range is what determines the rhombus size. The rhombus size is relative to the number of levels that a search has, as each level refers to a smaller and smaller rhombus within the search range. Therefore, in one embodiment, the inputted search range of the motion estimation may determine the number of levels to a search.

The center of the rhombus search can be determined using either a zero motion vector or a prediction motion vector. A zero motion vector assumes that a block of pixels has not changed positions from one frame to the next. A prediction motion vector predicts movement based on the motion vectors of the blocks surrounding the block subject to the search. In one embodiment, the motion vector can be calculated using the minimum sum of the absolute difference (SAD), as per the following equation where $\bar{v}$ is the motion vector:

$$\bar{v} = \min_{(\Delta x, \Delta y)} (SAD(\Delta x, \Delta y))$$

In one embodiment, the residues (otherwise referred to as the sum of absolute difference) are found by the following equation:

$$SAD(\Delta x, \Delta y) = \sum_{x=1}^{16} \sum_{y=1}^{16} |I_i(x_0 + x + \Delta x, y_0 + y + \Delta y) - I_j(x_0 + x, y_0 + y)|$$

where (x0, y0) is the position of the upper-left pixel of the block subject to search, $I_i(x,y)$ is the intensity at pixel location (x,y), and subscript j refers to the current frame and subscript i refers to the reference frame. The sum of the absolute difference refers to the difference between the intensity of the two blocks in two different frames. In another embodiment, the difference is measured as a sum of squared difference of pixel intensities of two blocks.

Figure 1A:
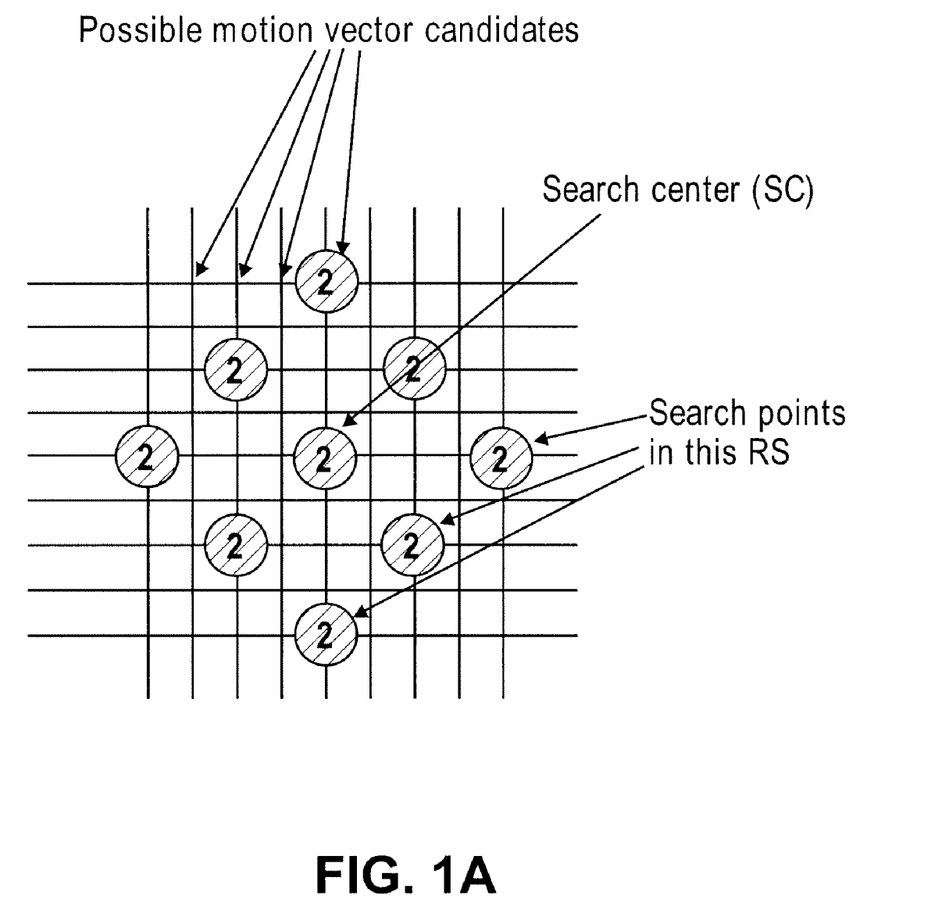
Figure 1B:
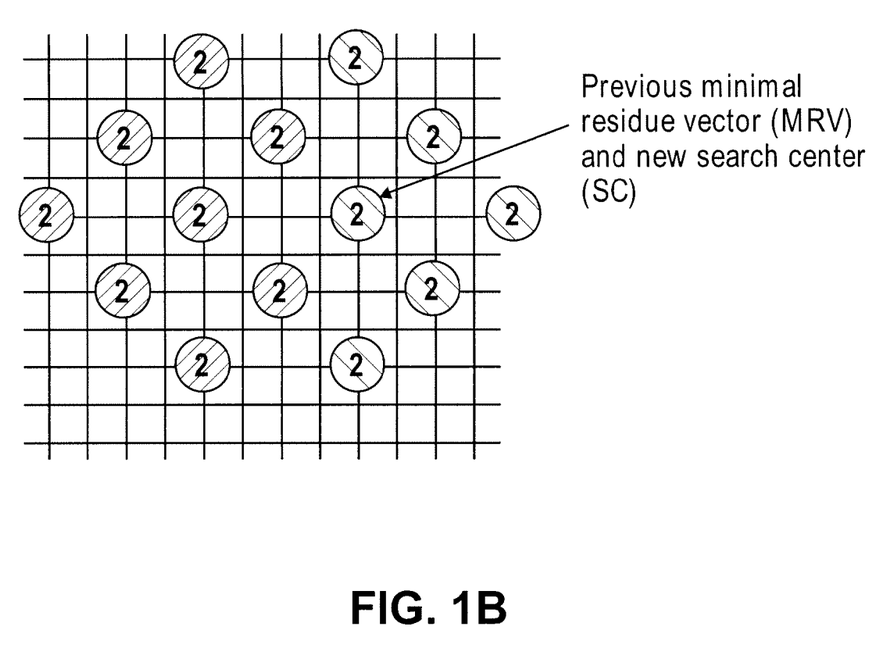

Several embodiments of the proposed rhombus search method are described here. An example of a 3-level rhombus search (RS) pattern is shown in FIG. 1. The levels refer to the different sizes of rhombus used, with the largest rhombus having the highest-level number (e.g. a Level 2 rhombus search as shown in FIG. 1(a)). The rhombus search is centered at the point where the chosen block was located in the previous frame. The search range can be determined by a variety of factors. The number of levels of RS is adaptive according to the content or the search range. In one embodiment, the number of levels of RS is determined by the logarithm of the search range. At each point of the rhombus shown in FIG. 1(a), the block encompassing that point is tested to see if the block matches the chosen block. If one of the points matches the chosen block more closely than the center block does, the center of the search is moved to the matching block, as per FIG. 1(b). The search at that level is then repeated.

Figure 1C:
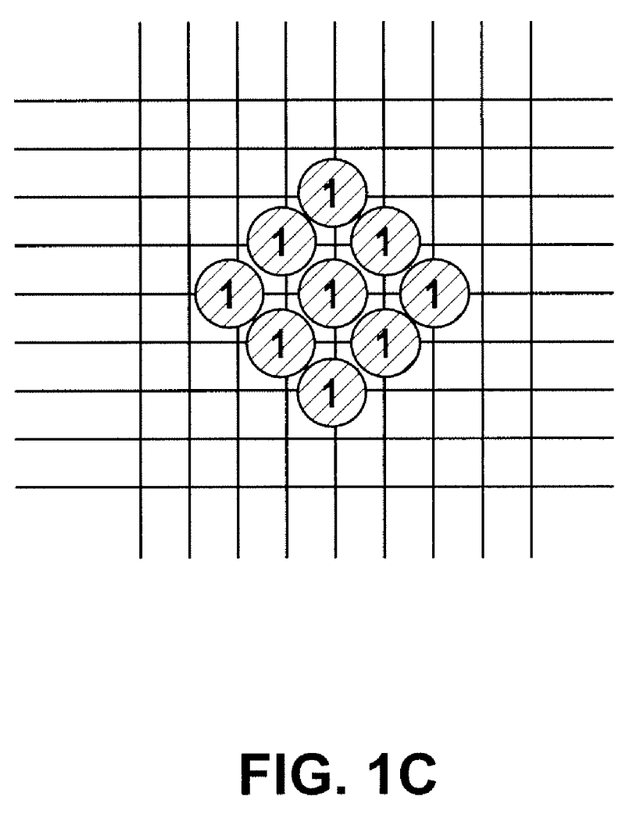
Figure 1D:
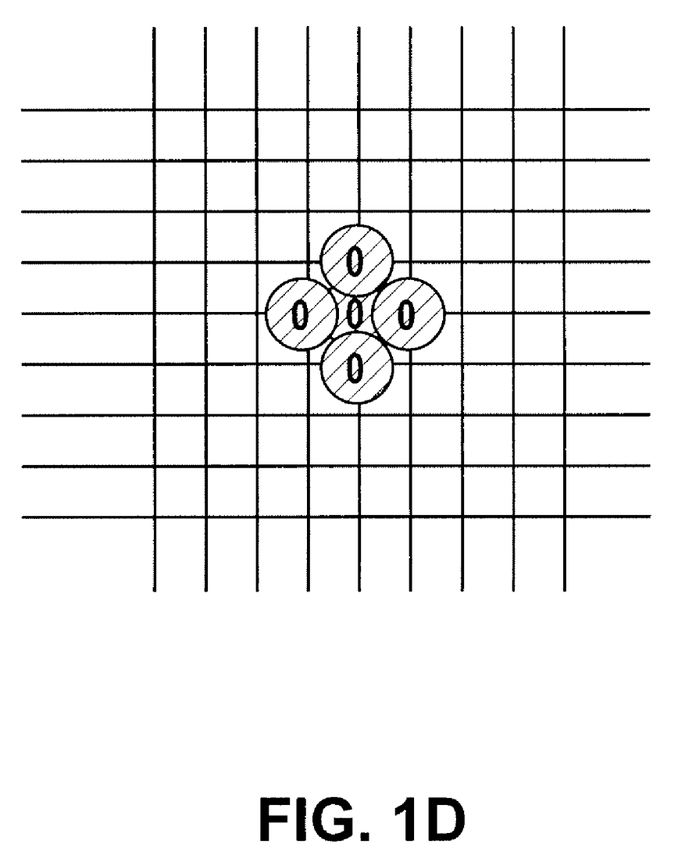

Once the center block is the block that most closely matches the chosen block, the search range is reduced, and the level number is reduced by one. For example, the next level rhombus search is reduced to Level 1 as shown in FIG. 1(c). The search at this level is performed much like the Level 2 search, only with a shorter range for the rhombus. The final search is performed at Level 0, as shown in FIG. 1(d). The Level 0 only checks those blocks at the corners of the rhombus. At this point, these blocks are probably the blocks directly adjacent to the chosen block. In one embodiment, if no blocks are found at this time that match the chosen block, the frame is determined to have changed too radically to be compressed in this manner. In one embodiment, the levels keep decreasing until a matching block is found. In an alternate embodiment, a block is determined to be a match when the intensity difference of the blocks is within a prescribed threshold.

Figure 2:
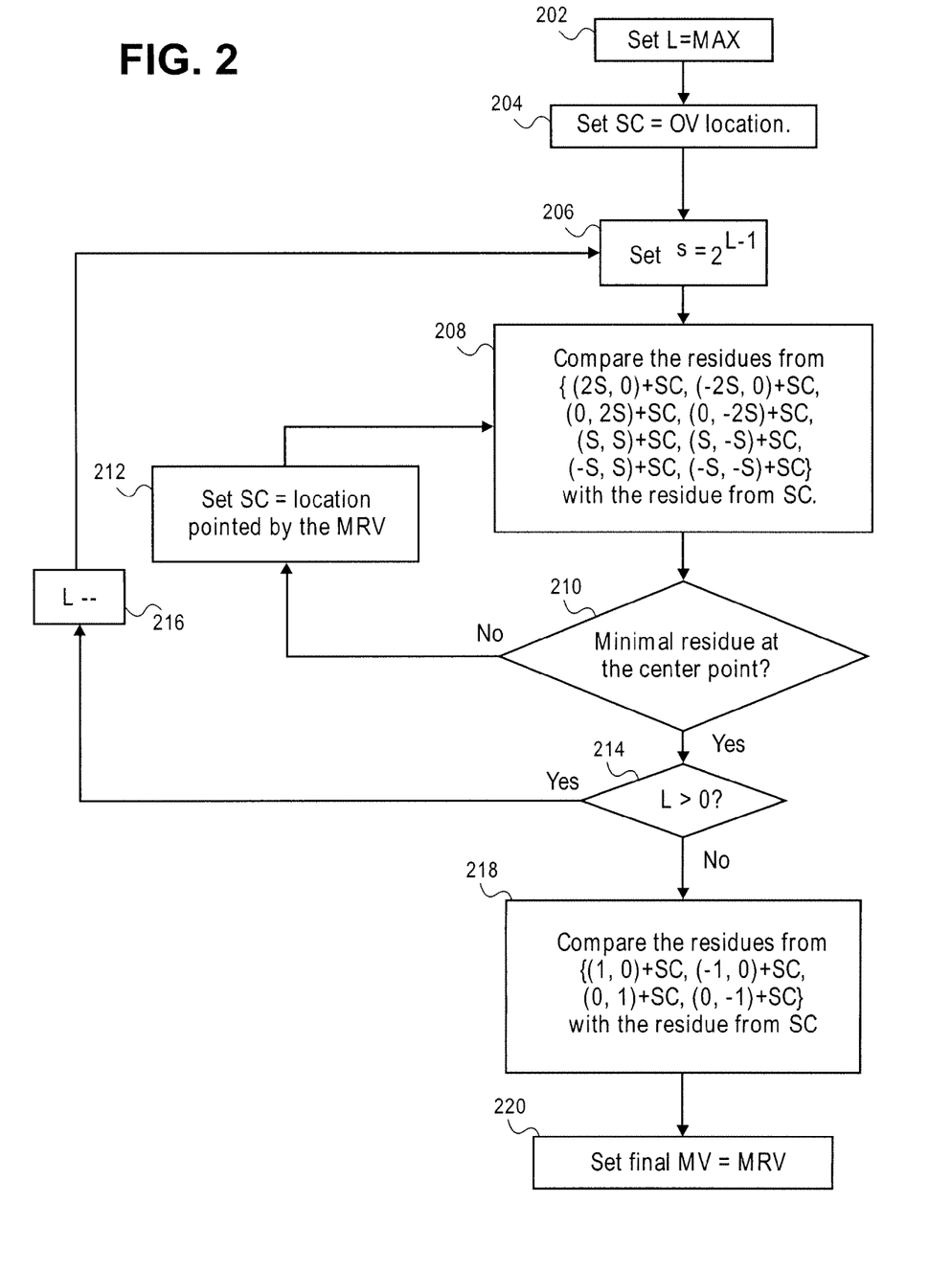
FIG. 2 is a flowchart for a zero vector multilevel rhombus-shaped searching method.

In one embodiment, the multi-level rhombus search method can be applied using a zero motion vector (OV) as the initial search center (SC), as shown in FIG. 2. The RS is set at the maximum level number L 202. The SC is set at the OV location 204. In one embodiment, the size (S) of the rhombus search equals 2 to the L-1 power 206. The residues from positions {(2S, 0)+SC, (-2S, 0)+SC, (0, 2S)+SC, (0, -2S)+SC, (S, S)+SC, (S, -S)+SC, (-S, S)+SC, (-S, -S)+SC} are compared with the residue from SC 208. If the motion vector (MV) that produced minimal residue in this RS is not the center point 210, the search center is moved to the location pointed by this minimal residue vector (MRV) 212, as further illustrated in FIG. 1(b). Then the comparison of the residues is repeated 208. If the motion vector that produced minimal residue in this RS is the center point 210 and the level is greater than 0 214, then the level number is decreased by one 216, while maintaining the same search center. Then the range is set to match the new level 206 and the residues are compared 208, as shown by FIG. 1(c). This process is repeated until the search level equals 0. A level-0 RS starts when the search level equals 0. As shown in FIG. 1(d), a level-0 RS is performed by comparing the residues from positions {(1, 0)+SC, (-1, 0)+SC, (0, 1)+SC, (0, -1)+SC} with the residue from SC 218. Finally, the final MV is set to the minimal residue vector (MRV) 220.

Figure 3A:
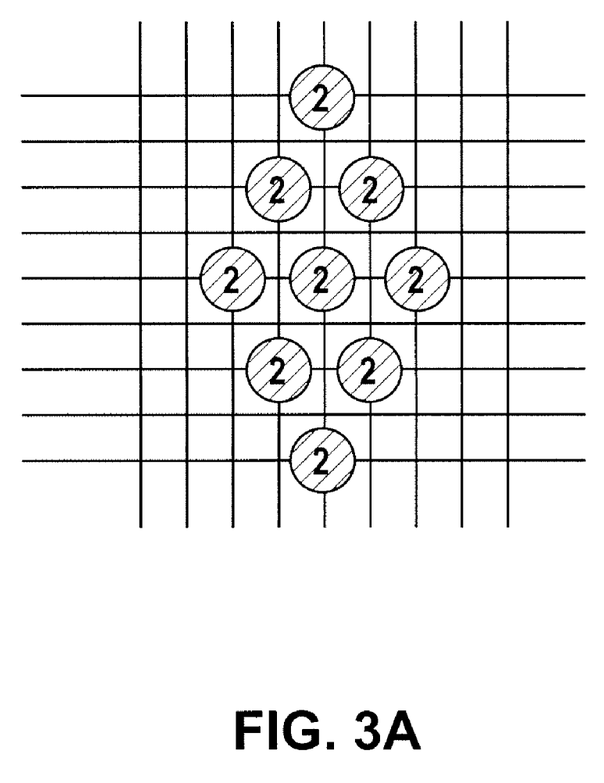
Figure 3B:
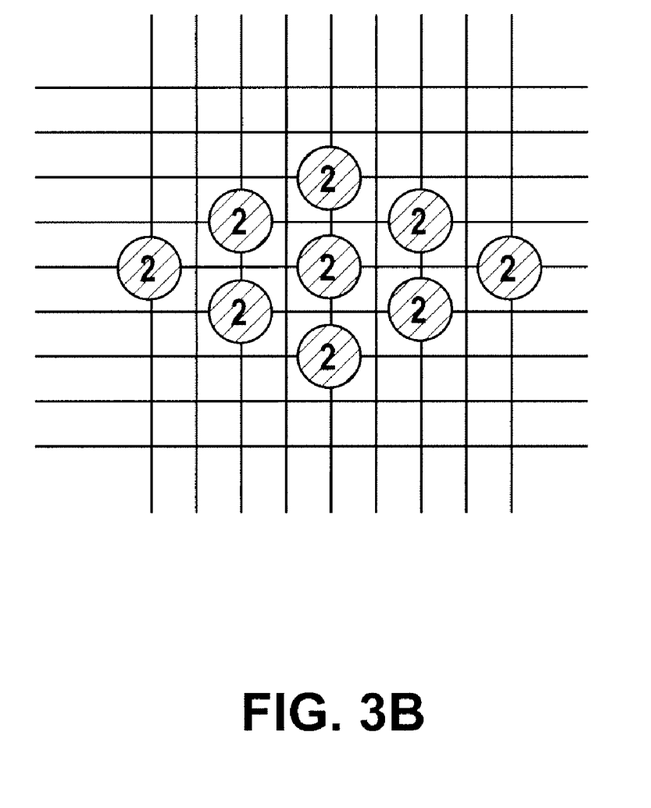

In one embodiment, the shape of the rhombus pattern is adaptive to suit the type of motion expected by a block of pixels in a given frame. Two variations of rhombus shape are shown in FIG. 3. The vertical rhombus search shape shown in FIG. 3(a) covers more search regions in the vertical direction than in the horizontal direction, which may perform better when motions are dominated in the vertical direction. Similarly, the horizontal rhombus search shape shown in FIG. 3(b) covers more search regions in the horizontal direction than in the vertical direction, which may be applied when motions are dominated in the horizontal direction. In one embodiment, rhombus search shape is based on the statistics collected from the previous picture and the current picture.

Figure 4:
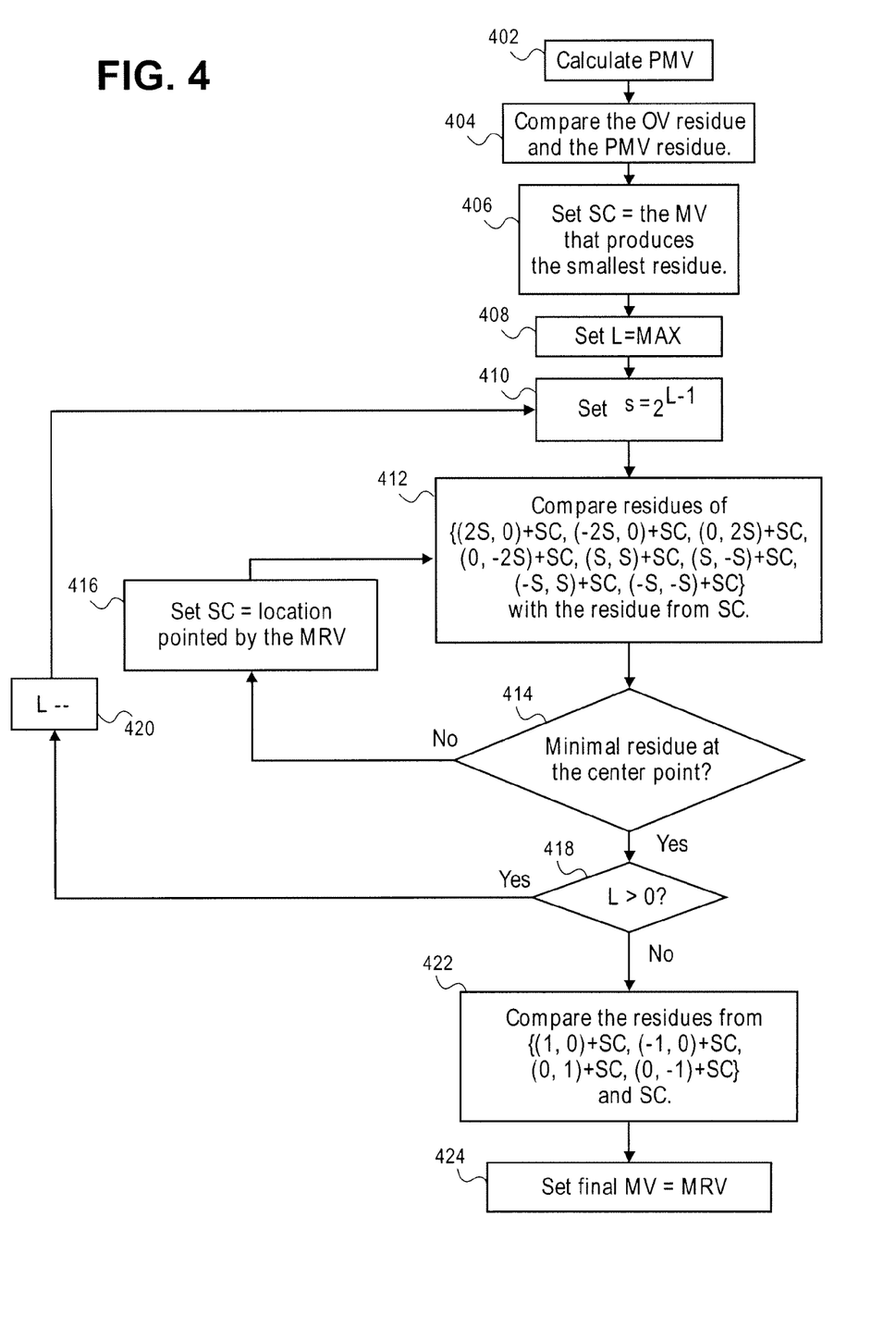
FIG. 4 is a flowchart for a multilevel rhombus-shaped searching method with a prediction motion vector comparison.

A second embodiment of the multi-level rhombus search uses the prediction motion vector (PMV) as the initial SC, as illustrated in the flowchart of FIG. 4. The PMV is calculated for the current block 402. Next, the residue using OV and the residue using PMV are compared 404. Then, the search center is set at the MV that produces the minimal residue between OV and PMV 406 and the rhombus search level is set to the maximum 408. In one embodiment, the size (S) of the rhombus search equals 2 to the L-1 power 410. From this new center, the residues from positions {(2S, 0)+SC, (-2S, 0)+SC, (0, -2S)+SC, (0, -2S)+SC, (S, -S)+ SC, (S, -S)+SC, (-S, S)+SC, (-S, -S)+SC} are compared with the residue from SC 412. If the MRV in this RS is not the center point 414, then the search center is moved to the location pointed by the MRV 416. Then the comparison of residues is repeated 412. If the MRV in this RS is the center point 414 and the level number is greater than zero 418, then the level number is decreased by one 420, maintaining the same search center. The range is reset to match the new level number 410 and the residue comparison is repeated 412. When level number 0 is reached 418, the residues from positions {(1, 0)+SC, (-1, 0)+SC, (0,1)+SC, (0, -1)+SC} are compared with the residue from SC 422. The final MV is set to the MRV 424.

Figure 5A:
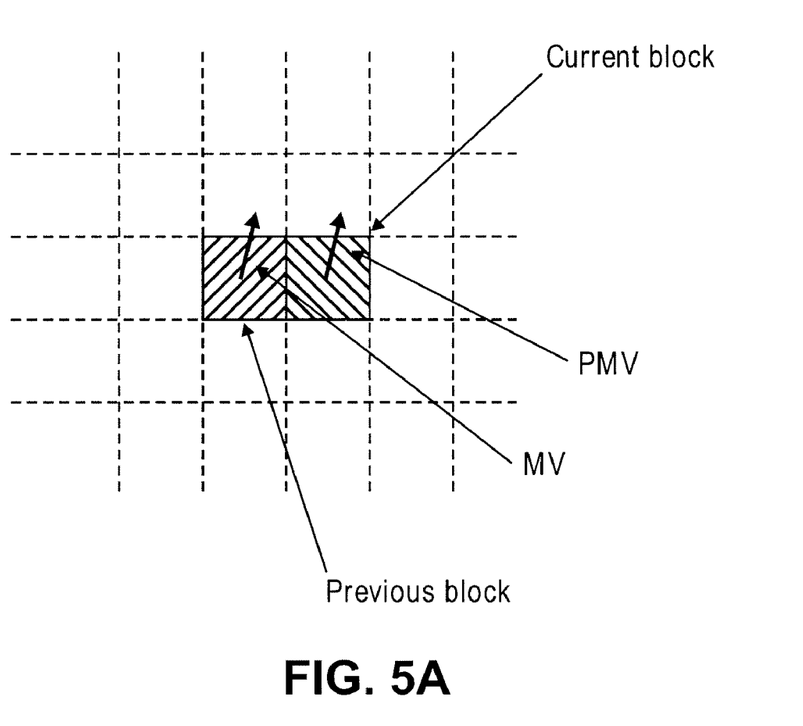
Figure 5B:
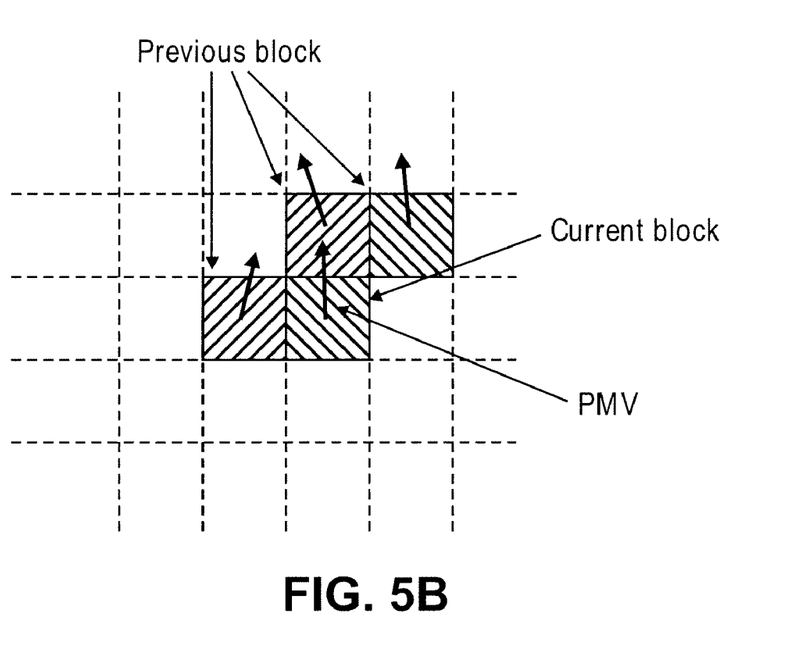

The PMV can be adaptively calculated by motion vector (s) of block(s) temporally or spatially adjacent to the block that we would like to find the motion vector for (otherwise, referred to as the current block). In one embodiment, the PMV is calculated using the MV of block in the preceding picture, which has the same position as the current block. In one embodiment, the prediction motion vector can be determined using the motion vectors of the blocks neighboring the chosen block in the preceding frame. The prediction motion vector can be based on the motion vector of a single block that is adjacent to the chosen block. In one embodiment, as shown in FIG. 5(a), the PMV is equal to the motion vector of a block adjacent to the current block. In another embodiment, as shown in FIG. 5(b) the horizontal component of the PMV is calculated by a median of the horizontal components of a set of motion vectors of a set of blocks neighboring the current block while the vertical component of the PMV is calculated by a median of the vertical components of a set of motion vectors of a set of blocks neighboring the second block in the second frame.

Figure 6:
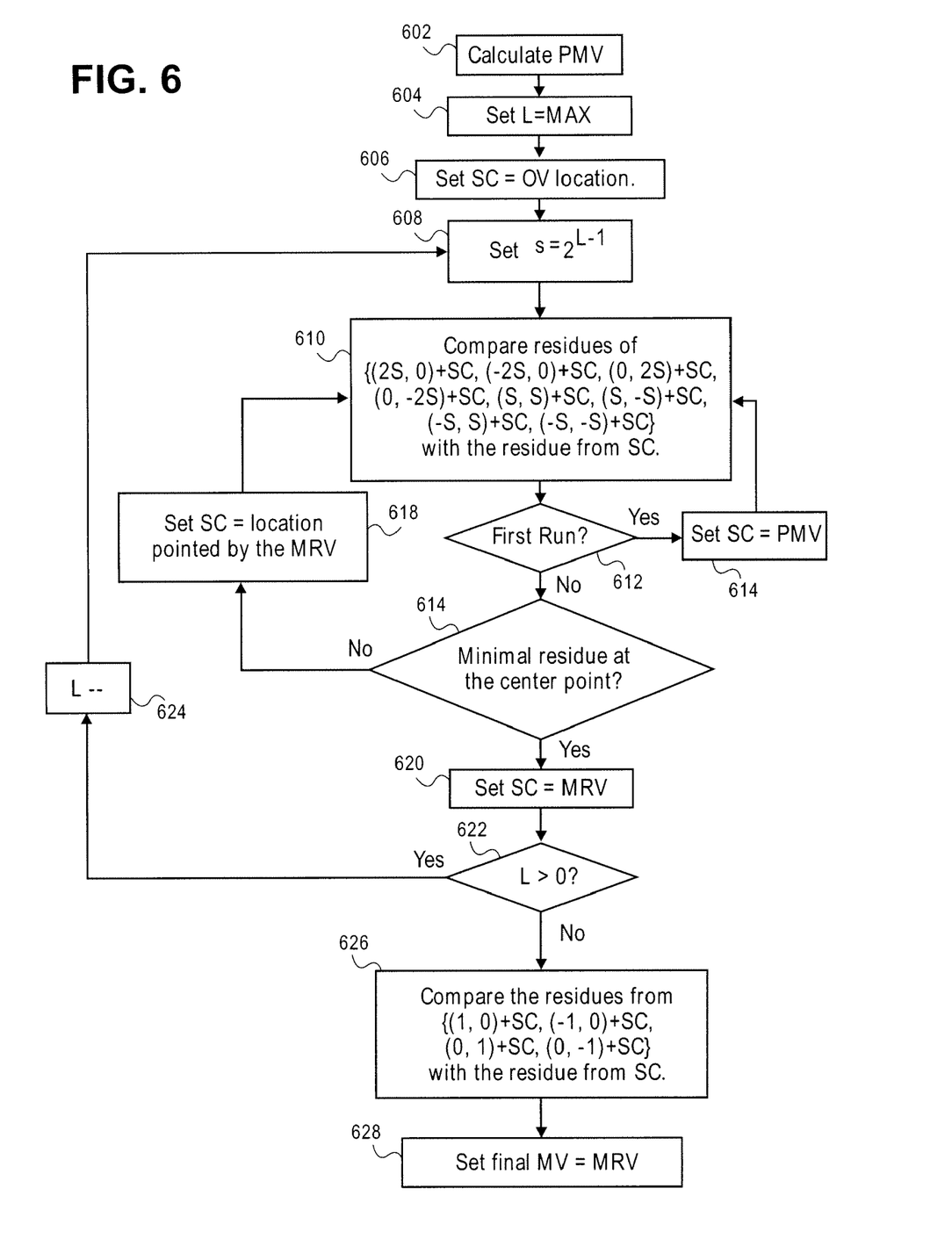
FIG. 6 is a flowchart for a multilevel rhombus-shaped searching method with a prediction motion vector comparison.

Another embodiment is to extend the initial comparison to include the neighboring rhombus search points of the prediction motion vector, as illustrated by the flowchart of FIG. 6. First the PMV is calculated for the current block 602, setting the search level to the maximum 604 with a search center at OV 606. In one embodiment, the size (S) of the rhombus search equals 2 to the L-1 power 608. Next, the residues from positions {(2S, 0)+SC, (-2S, 0)+SC, (0, 2S)+SC, (0, -2S)+SC, (-S, -S)+SC, (S, -S)+SC, (-S, S)+SC, (-S, -S)+SC} are compared with the residue from SC 610. After comparing residues at OV 612, the search is then centered at PMV 614. The residues from positions {(2S, 0)+SC, (-2S, 0)+SC, (0, 2S)+SC, (0, -2S)+SC, (S, S)+SC, (S, -S)+SC, (-S, S)+SC, (-S, -S)+SC} are compared with the residue from SC 610. The search points with the smallest residue for both the OV and the PMV are examined 616. If the MRV in this RS is neither OV nor the PMV 616, the search center is moved to the location pointed by the MRV 618 and the residue comparison process is repeated 610. Otherwise, the search center is set to the MRV 620, and, if the level number is greater than 0 622, then the level number decreases by 1 624. The search range is adjusted accordingly 608 and the residue comparison process is repeated using the same search center 610. When the level number reaches 0 622, the residues from positions {(1, 0)+SC, (-1, 0)+SC, (0, 1)+SC, (0, -1)+SC} are compared with the residue from SC 626. The final motion vector is set to the motion vector that produces the smallest residue 628.

Figure 7:
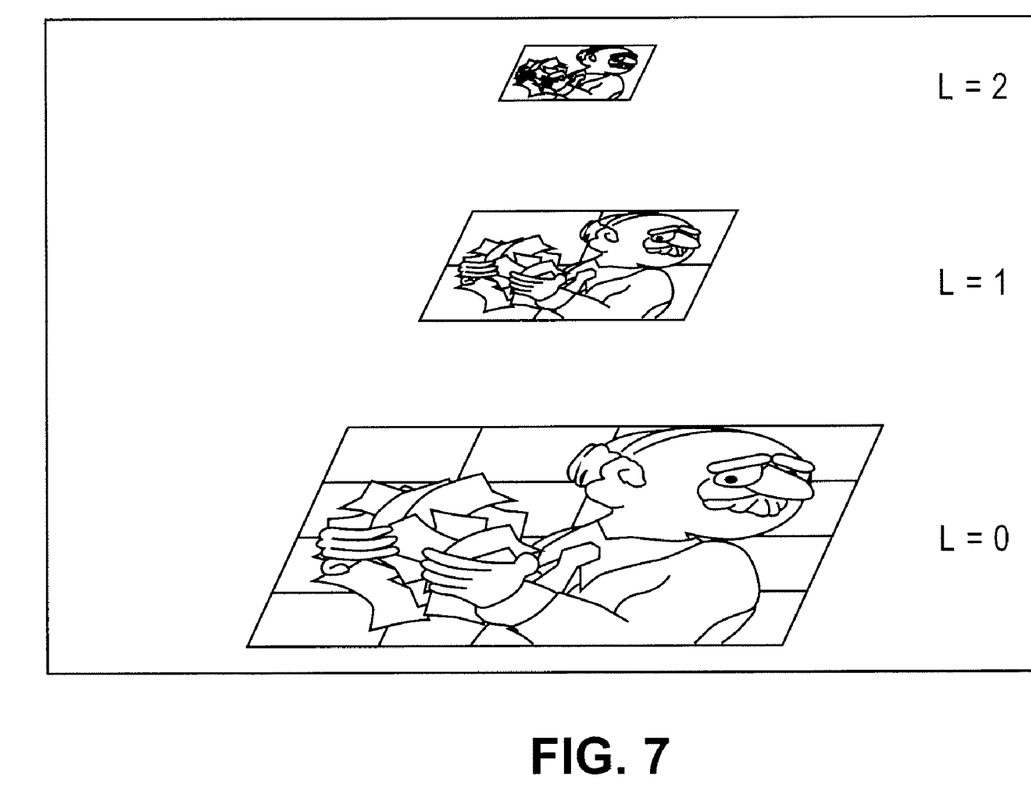
FIG. 7 is a diagram illustrating resolution reduction.

Instead of having distance of search points larger in a higher level, another embodiment keeps the same distance for different levels by reducing the image resolution when the level is higher. Reducing the resolution allows the search to cover a greater area, as the picture is coarser making movement more obvious. The matching criteria are modified accordingly to reflect this reduction of resolution. As shown in FIG. 7, each picture in a video sequence is preprocessed to create a picture stack similar to the MIPMAP, an array of pixel images of varying pixel depths, used in 3D graphics. In one embodiment, two to one sub-sampling is performed along both horizontal and vertical directions to create next higher-level pictures. Then the above method can be modified using data from the pictures in various levels as in FIG. 7, while keeping the rhombus search pattern constant as shown in FIG. 1(c).

Figure 8:
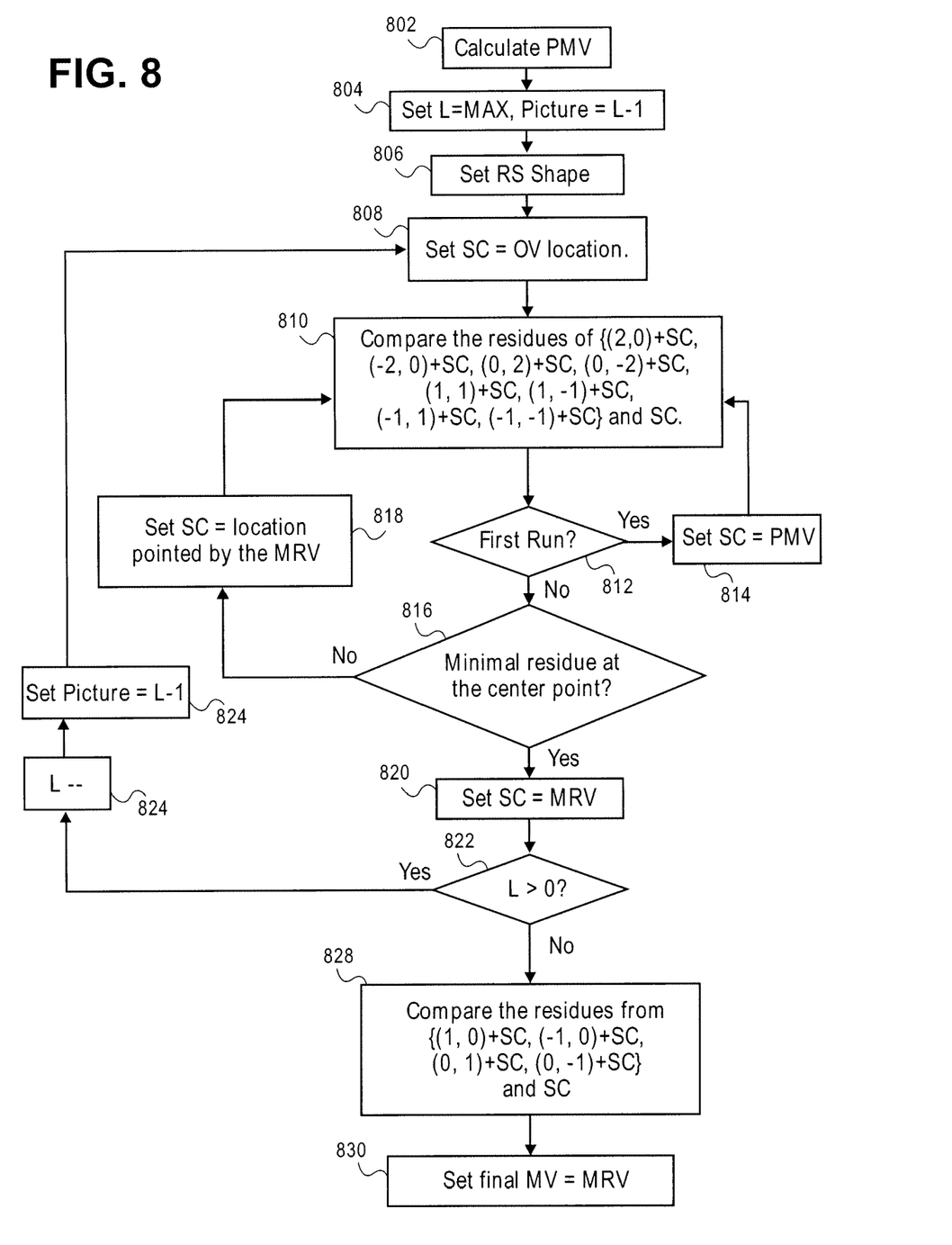
FIG. 8 is a flowchart for a multilevel adaptive shape rhombus-shaped searching method with a prediction motion vector comparison.

A fourth embodiment can be employed to take advantage of adaptive search shapes and resolution reduction. First, the prediction motion vector is calculated for the current block 802. The level number is set to the maximum, and the picture resolution is set to a level number one less 804. The rhombus search shape is chosen 806. The search center is set at OV 808. The residues from positions {(2, 0)+SC, (-2, 0)+SC, (0, 2)+SC, (0, -2)+SC, (1,1)+SC, (1, -1)+SC, (-1, 1)+SC, (-1, -1)+SC} are compared with the residue from SC 810. After comparing residues at OV 812, the search center is set at PMV 814. The residue comparison is repeated 810. The search points with the smallest residue for both the zero vector and the PMV are examined 816. If the MRV in this RS is neither the zero motion vector nor the prediction motion vector 816, then the search center is moved to the location pointed by the MRV 818 and the residue comparison process is repeated 810. Otherwise, the search center is moved to the MRV 820, and, if the level number is greater than zero 822, the level number is decreased by one 824. The picture resolution is set to one less than the level number 826 and the residue comparison process is repeated 810. When the level number reaches zero 822, the residues from positions {(1, 0)+SC, (-1, 0)+SC, (0, 1)+SC, (0, -1)+SC} are compared with the residue from SC, where the residues are computed on level 0 pictures 828. The final motion vector is set to the motion vector that produces the smallest residue 830. In another embodiment, if the MRV in 830 is not the SC and the rhombus region contains any unchecked points, the SC of the level-0 RS is set to the new motion vector that produces the smallest residue, and another level-0 RS is performed.

Figure 9:
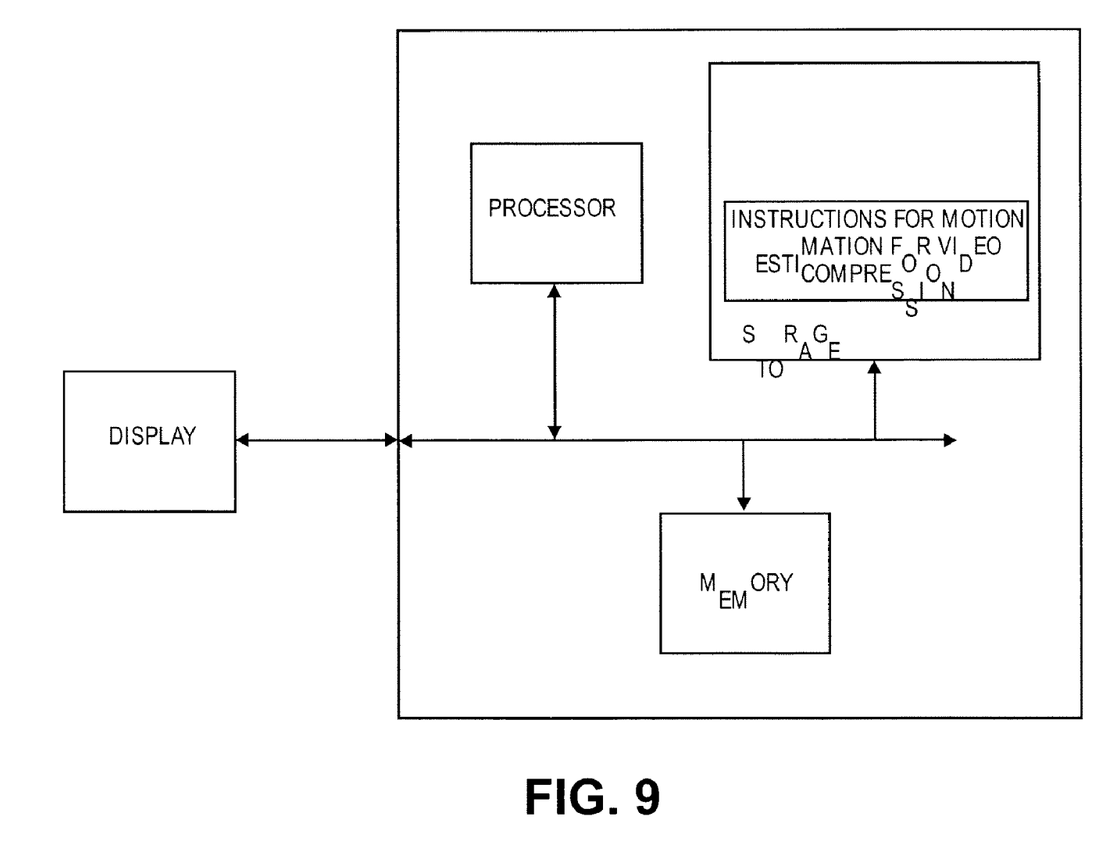
FIG. 9 is a diagram illustrating an exemplary system used to implement the method.

The method described above can be stored in the memory of a computer system (e.g., personal computer, set top box, video recorders, etc.) as a set of instructions to be executed, as illustrated by way of example in FIG. 9. In addition, the instructions to perform the method described above could alternatively be stored on other forms of machine-readable media, including magnetic and optical disks. For example, the method of the present invention could be stored on machine-readable media, such as magnetic disks or optical disks, which are accessible via a disk drive (or computer-readable medium drive). Further, the instructions can be downloaded into a computing device over a data network in a form of compiled and linked version.

Alternatively, the logic to perform the methods as discussed above, could be implemented in additional computer and/or machine readable media, such as discrete hardware components as large-scale integrated circuits (LSI's), application-specific integrated circuits (ASIC's), and firmware such as electrically erasable programmable read-only memory (EEPROM's). Such logic could be included in a computer system such as such logic as the one illustrated in FIG. 9.

Although the present invention has been described with reference to specific exemplary embodiments, it will be evident that various modifications and changes may be made to these embodiments without departing from the broader spirit and scope of the invention. Accordingly, the specification and drawings are to be regarded in an illustrative rather than a restrictive sense.

Using multi-level rhombus search can cover a larger search range efficiently when the input video sequence has a larger motion range. The motion estimation performs searches starting from blocks predicated by both a zero motion vector and a prediction motion vector. Using a prediction motion vector can reduce the search efforts and reduce the bit-rate when the motion of neighboring blocks of pixels matches the motion of the block subject to the search.

The invention claimed is:

1. A method comprising:
   positioning a search pattern relative to a first pixel block of a first frame of video based on a motion vector;
   comparing, based on a first predetermined criteria, a second pixel block in a second frame of video with a set of pixel blocks from the first frame at separate search points of the search pattern and the first pixel block;
   repositioning the search pattern and repeating the comparing and repositioning using a search pattern of identical size about a position meeting the first predetermined criteria; and
   maintaining the center of the search pattern at the location of a minimal residue vector and iteratively narrowing the search pattern until a second predetermined criteria is met;
   wherein the second predetermined criteria is related to a threshold level of the first predetermined criteria.

2. The method of claim 1, wherein the first predetermined criteria is a measurement of pixel intensity or pixel color.

3. The method of claim 1, wherein repositioning includes shifting the search pattern in a direction towards a minimal residue vector.

4. The method of claim 1, wherein the second predetermined criteria is related to a size of the search pattern.

5. The method of claim 1, further including reducing resolution of the first frame and the second frame, and adjusting the first predetermined criteria to correspond to a reduced resolution.

6. The method of claim 1, wherein the search pattern is rhombus shaped.

7. The method of claim 6, wherein the rhombus shape has an independently adaptive height and width.

8. The method of claim 7, further including adjusting the height and width of the rhombus based on statistics collected from the first frame and the second frame.

9. The method of claim 1, wherein the motion vector is a zero motion vector.

10. The method of claim 1, wherein the motion vector is a prediction motion vector.

11. The method of claim 10, wherein the prediction motion vector is calculated by a motion vector of one or more blocks adjacent to the second block in the second frame.

12. A computer readable storage medium tangibly embodying a sequence of instructions executable by the computer to perform a method comprising:
   positioning a search pattern relative to a first pixel block of a first frame of video based on a motion vector;
   comparing, based on a first predetermined criteria, a second pixel block in a second frame of video with a set of pixel blocks from the first frame at separate search points of the search pattern and the first pixel block;

repositioning the search pattern and repeating the comparing and repositioning using a search pattern of identical size about a position meeting the first predetermined criteria; and maintaining the center of the search pattern at the location of a minimal residue vector and iteratively narrowing the search pattern until a second predetermined criteria is met;

wherein the second predetermined criteria is related to a threshold level of the first predetermined criteria.

13. The computer-readable storage medium of claim 12, wherein repositioning includes shifting the search pattern in a direction towards a minimal residue vector.

14. The computer-readable storage medium of claim 12, further including reducing resolution of the first frame and the second frame, and adjusting the first predetermined criteria to correspond to a reduced resolution.

15. The computer-readable storage medium of claim 12, wherein the search pattern is rhombus shaped.

16. The computer-readable storage medium of claim 15, wherein the rhombus shape has an independently adaptive height and width.

17. The computer-readable storage medium of claim 12, wherein the motion vector is a zero motion vector.

18. The computer-readable storage medium of claim 12, wherein the motion vector is a prediction motion vector calculated by a motion vector of one or more blocks adjacent to the second block in the second frame.

19. A system, comprising:
a first logic unit to position a search pattern relative to a first pixel block of a first frame of video based on a motion vector;
a second logic unit to compare, based on a first predetermined criteria, a second pixel block in a second frame of video with a set of pixel blocks from the first frame at separate search points of the search pattern and the first pixel block; and
a third logic unit to reposition the search pattern and repeating the comparing and repositioning using a search pattern of identical size about a position meeting the first predetermined criteria; and
a fourth logic unit to maintain the center of the search pattern at the location of a minimal residue vector and iteratively narrowing the search pattern until a second predetermined criteria is met;
wherein the second predetermined criteria is related to a threshold level of the first predetermined criteria.

20. The system of claim 19, wherein the second predetermined criteria is related to a size of the search pattern.

21. The system of claim 19, wherein the search pattern has an adaptive shape.

22. The system of claim 19, wherein the motion vector is a zero motion vector.

23. The system of claim 19, wherein the motion vector is a prediction motion vector calculated by a motion vector of one or more blocks adjacent to the second block in the second frame.

24. A system, comprising:
a first means for positioning a search pattern relative to a first pixel block of a first frame of video based on a motion vector;
a second means for comparing, based on a first predetermined criteria, a second pixel block in a second frame of video with a set of pixel blocks from the first frame at separate search points of the search pattern and the first pixel block;
a third means for repositioning the search pattern and repeating the comparing and repositioning using a search pattern of identical size about a position meeting the first predetermined criteria; and
a fourth means for maintaining the center of the search pattern at the location of a minimal residue vector and iteratively narrowing the search pattern until a second predetermined criteria is met;
wherein the second predetermined criteria is related to a threshold level of the first predetermined criteria.

25. The system of claim 24, wherein the second predetermined criteria is related to a size of the search pattern.

26. The system of claim 24, further comprising a fourth means for reducing resolution of the first frame and the second frame, and to adjust the first predetermined matching criteria to correspond to a reduced resolution.

27. The system of claim 24, wherein the search pattern has an adaptive shape.

28. The system of claim 24, wherein the motion vector is a zero motion vector.

29. The system of claim 24, wherein the motion vector is a prediction motion vector calculated by a motion vector of one or more blocks adjacent to the second block in the second frame.

* * * * *